United States Patent
Regan et al.

[11] Patent Number: 5,439,594
[45] Date of Patent: Aug. 8, 1995

[54] METHOD FOR SUBSURFACE VAPOR EXTRACTION

[75] Inventors: Terence R. Regan, Newburyport; Boris Dynkin, Newton, both of Mass.

[73] Assignee: Geraghty & Miller, Inc., Denver, Colo.

[21] Appl. No.: 81,427

[22] Filed: Jun. 23, 1993

[51] Int. Cl.⁶ .......................... C02F 1/20; E21B 43/00
[52] U.S. Cl. ..................... 210/747; 210/170; 210/220; 210/908; 210/909; 166/265; 166/266; 166/267; 166/370; 95/246
[58] Field of Search ............... 210/747, 170, 220, 908, 210/909; 166/265, 266, 267, 370; 95/246

[56] References Cited

U.S. PATENT DOCUMENTS

| | | |
|---|---|---|
| 4,323,122 | 4/1982 | Knopik . |
| 4,574,062 | 3/1986 | Weitman ............... 261/147 |
| 4,625,801 | 12/1986 | McLaughlin . |
| 4,660,639 | 4/1987 | Visser et al. ........... 166/267 |
| 4,715,965 | 12/1987 | Sigerson et al. ........... 210/800 |
| 4,832,711 | 5/1989 | Christel, Jr. et al. . |
| 4,846,852 | 7/1989 | Schweitzer et al. . |
| 4,886,119 | 12/1989 | Bernhardt . |
| 4,892,688 | 1/1990 | Bernhardt . |
| 4,943,305 | 7/1990 | Bernhardt . |
| 4,950,394 | 8/1990 | Bernhardt . |
| 4,966,611 | 10/1990 | Schumacher et al. . |
| 5,009,266 | 4/1991 | Dieter ................. 166/245 |
| 5,015,365 | 5/1991 | Vara et al. . |
| 5,017,289 | 5/1991 | Ely . |
| 5,050,676 | 9/1991 | Hess et al. ............ 166/267 |
| 5,076,360 | 12/1991 | Morrow . |
| 5,086,717 | 2/1992 | McCrossan . |
| 5,095,975 | 3/1992 | Bernhardt . |
| 5,111,883 | 5/1992 | Savery ................. 166/269 |
| 5,116,163 | 5/1992 | Bernhardt . |
| 5,122,165 | 6/1992 | Wang et al. . |
| 5,122,166 | 6/1992 | Hyrcyk et al. . |
| 5,143,606 | 9/1992 | Bernhardt . |
| 5,143,607 | 9/1992 | Bernhardt . |
| 5,147,535 | 9/1992 | Bernhardt . |
| 5,171,103 | 12/1992 | Bernhardt . |
| 5,180,503 | 1/1993 | Gorelick . |
| 5,183,563 | 2/1993 | Rodden . |
| 5,197,541 | 3/1993 | Hess . |

FOREIGN PATENT DOCUMENTS

92/14533 9/1992 WIPO .

*Primary Examiner*—Thomas M. Lithgow
*Attorney, Agent, or Firm*—Standley & Gilcrest

[57] ABSTRACT

Methods for vacuum extraction of contaminants from subsurface media which involves vacuum withdrawal through a conduit, of vaporized contaminant, assisted by a tube for allowing air bubbles to flow through the liquid-phase hydrocarbon zone thereby causing enriched hydrocarbon vapors to be extracted through the vacuum applied to the conduit.

4 Claims, 1 Drawing Sheet

METHOD FOR SUBSURFACE VAPOR EXTRACTION

BACKGROUND AND SUMMARY OF THE INVENTION

The present invention is related to an apparatus and method for the extraction of contaminants from subsurface soils. In particular, the present invention provides an apparatus and method for introducing air into a zone of liquid-phase contaminants in subsurface media to thereby increase contaminant vapor concentrations being extracted from the well in the form of volatilized contaminant.

Vacuum extraction of volatile organic compounds from soil has been known as a popular remediation technique. Typically, a recovery well is installed in the contaminated region to recover subsurface vapors and gases by applying a vacuum to the well via a vacuum pump at the ground surface, for example. The vacuum pump can exhaust vapors to the atmosphere or to contaminant recovery equipment such as filter equipment or a combustion chamber depending upon the contaminants and their concentrations.

Contamination of the subsurface soils with potentially hazardous materials happens as a result of spills, leakage from storage facilities, or surface discharges. The contaminants may eventually percolate into the ground water posing a health threat to drinking water supplies. It is desirable to be able to remove the contaminant from subsoil regions as quickly as possible. Currently, known methods of contaminant removal take too long and are not as successful as the industry would like in connection with removing all or substantially all of the contaminant at a particular site.

The present invention is concerned with removing liquid-phase hydrocarbons floating on top of the water table. The present invention provides a method and apparatus for removing volatile and semi-volatile contaminants from any depth without expensive excavation of a large amount of contaminated soil or rock. The equipment used to perform the present invention can be conventional equipment, controlled at the surface of the ground. With the exception of the well casing and associated components which will be described hereinafter, there is very little disruption of the subsurface media with the present invention.

The present invention includes the steps of directly removing vapor-phase, liquid-phase, and adsorbed-phase volatile and semi-volatile organic compounds from primarily porous layers of soil or rock by vacuum extraction. Once the contaminant is collected at the surface it may be treated at the site or treated elsewhere and later disposed of in a proper manner.

According to the present invention one or more wells are drilled into the subsurface media in the contaminated area. The well may be constructed so that liquid-phase hydrocarbons may flow into the well as gases. The upper portion of the well is preferably impervious, whereas the lower portion of the well is preferably perforate. The lower portion of the well may be surrounded by an air permeable material, such as gravel. The upper portion of the well may be surrounded with a material of low vapor permeability to inhibit leakage of air from the surface of the ground to the lower perforate portion of the well. The upper end of the well is preferably connected to a suitable vacuum source, for example an air blower or vacuum pump, to create a negative pressure (vacuum) in the well, thus inducing flow of air containing gaseous phase contaminants directly into the perforate lower portion of the well. The exhaust of the air blower or vacuum pump may be connected to a suitable recovery or treatment system.

Furthermore, the well of the present invention would include an inner tube which would descend from the surface to the zone of liquid-phase hydrocarbons in the subsurface media, above the water table. At the surface air may enter the tube and flow down through the tube such that air exits the tube in the region of the liquid-phase hydrocarbons. Resulting bubbles created in the liquid-phase hydrocarbons greatly increase the contaminant evaporation rate of the liquid-phase hydrocarbons to assist in the removal of liquid-phase contaminant.

According to the invention contaminants are removed from the subsurface media of a contaminated underground area by first establishing a borehole from the surface of the ground within the contaminated area by drilling or driving a borehole in any conventional manner. The borehole would preferably extend into the water table. A conduit or well casing is inserted in and may be radially inwardly spaced from the borehole so that a ring or annular zone is defined between the borehole and the conduit. The conduit preferably has a perforate lower portion so that fluids can flow into its interior, whereas the upper portion of the conduit is impervious. The annular zone defined above may be filled with a loose, fluid permerable, fill material which extends substantially up to the upper end of the perforate lower portion of the conduit. The annular zone above the perforate lower portion of the conduit may be packed with a second fill material of low permeability to impede air flow from the ground surface downward toward the lower portion of the borehole. An air tube may then be installed within the conduit descending through the sealed cap at the ground surface to the liquid-phase hydrocarbons in the perforate lower portion of the conduit. A vacuum inside the conduit created by the vacuum pump draws air from the atmosphere through the air tube down into the liquid-phase hydrocarbons. Resulting air bubbles travel upwards through the liquid-phase hydrocarbons and become saturated with hydrocarbon vapors. As the hydrocarbon vapor-laden bubbles reach the liquid surface, they are drawn to the upper end of the conduit for recovery or discharge.

DETAILED DESCRIPTION OF THE PREFERRED EMBODIMENT(S)

Figure 1:
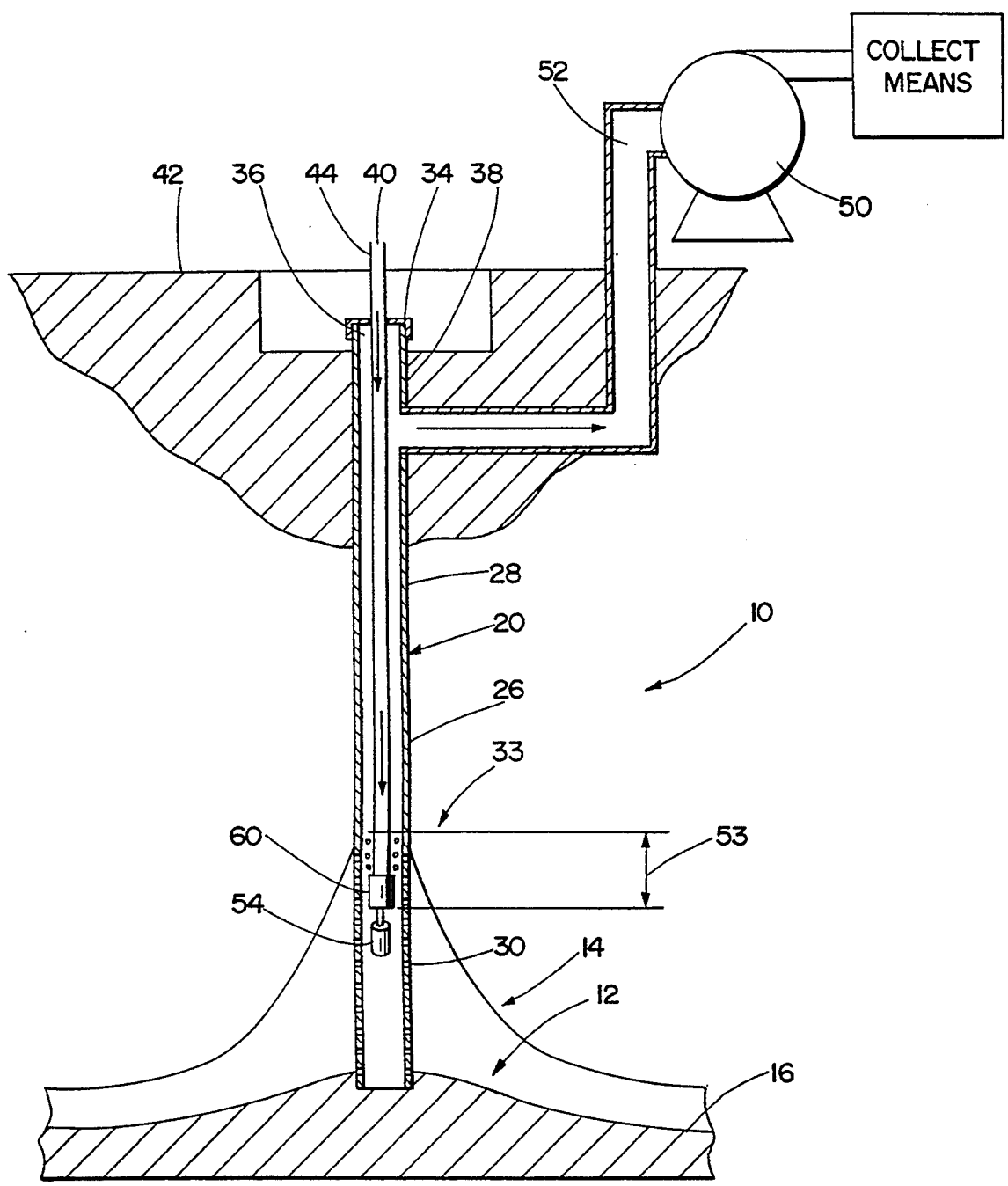
FIG. 1 is a schematic view of a vacuum extraction system according to the present invention.

Referring now to FIG. 1, there is shown schematically a system designated generally by the reference numeral 10 for vacuum extraction of contaminant from the subsurface at a contaminated site. A layer of liquid-phase hydrocarbons is typically found floating on top of the ground-water table at contaminated sites. Seen in FIG. 1 is a zone 12 of liquid-phase volatile or semi-volatile contaminants, floating on top of the natural ground-water table 16. An extraction well 20, described in greater detail hereinafter, is placed within the area of the liquid-phase hydrocarbons and extends through the layer of liquid-phase hydrocarbons 12 and below the water table 16. Thus by applying a vacuum to the well casing contaminant in the vapor phase will ascend up the well to be collected at the surface. Depending upon the vacuum pressure applied at the surface, liquid phase contaminant and/or water may also be collected.

Referring again to FIG. 1, the extraction well will now be explained in greater detail. A casing 26 having an upper impervious portion 28 and a lower perforate portion 30 is installed into the well borehole. The casing 26 will extend from the ground surface to a depth sufficient to extend below the ground-water table 16. A sufficient portion of the perforate portion 30 of the casing 26 will reside above the ground water table 16 within the layer of liquid-phase hydrocarbons and above into the unsaturated zone 33. A sealed cap 34 may be installed on the surface end 36 of a branch 38 of the casing. The cap 34 may be adapted to secure an air tube 40 at the ground surface 42 which will descend through the casing into the liquid-phase hydrocarbons floating on top of the water table. An upper end 44 of tube 40 is preferably left exposed to the atmosphere to allow air from the atmosphere to pass into the tube. The air tube is preferably of a small diameter in relation to the casing diameter so that it does not interfere to any great extent with the extraction of vapors through the casing. The air tube is preferably of a solid material such as PVC. A vacuum blower 50 positioned at the ground surface and attached to another branch 52 of the casing is sufficient to create a vacuum within the casing causing air to be drawn down the air tube and into the liquid-phase hydrocarbons. Thus as air is entering the liquid-phase hydrocarbons from the air tube, causing air bubbles which increase the evaporation rate of the liquid-phase hydrocarbons, a vacuum applied to the upper portion of the casing will cause the hydrocarbon vapors to ascend up the well to the surface of the ground.

The air tube can be effectively used, without any pumps or blowers attached thereto, to assist in the removal of liquid-phase hydrocarbons (volatilized or semi-volatilized) from the unsaturated zone just above the water table.

The bottom or exit end 60 of the air tube preferably is perforated or has an air diffuser attached to increase the surface area-to-volume ratio of air bubbles drawn from the pipe. The number of inches that the air tube can be submerged into the liquid-phase hydrocarbons 53 must be less than the suction (expressed in inches of water column) being applied in the well. That is, if ten inches of vacuum is being applied, the air tube should not be submerged more than ten inches into the layer of liquid-phase hydrocarbons. An optional float system 54 may be attached to the bottom of the air tube 60 to better control the depth of submergence 53 which may (otherwise) change due to the removal of liquid-phase hydrocarbons and/or natural fluctuations in the elevation of the ground-water table 16.

Under the above conditions the vacuum created in the well will pull air from the atmosphere through the open end of the air tube and out the bottom end through the air diffuser. As air is pulled into the hydrocarbons, bubbles form and travel up through the layer of hydrocarbons and into the air extracted by the suction on the conduit. As the bubbles move through the hydrocarbons, the air in the bubbles become enriched with hydrocarbon vapors. The enriched vapor concentration means more hydrocarbons are extracted over a given time period, relative to a conventional extraction system without the air tube. There are two distinct advantages to enriching the vapor concentration: (1) hydrocarbons are removed from the subsurface faster, resulting in shorter remediation time, and (2) in systems using thermal oxidizers or other combustion chambers for a treatment source at the ground surface, less external electrical or fossil fuel energy is required to operate the treatment system. Both of these advantages decrease remediation costs.

A commonly used treatment system is a thermal oxidizer, which burns the recovered hydrocarbon vapors. Thermal oxidizers require an electrical or fossil fuel energy source to supplement the energy provided by the recovered hydrocarbon vapors. Under the present invention, the extracted vapors have an enriched concentration containing more hydrocarbons which results in less need on the part of the thermal oxidizer for an external energy source in order to operate the treatment system. Using less external energy saves money.

In a separate embodiment of the present invention, the invention may be used where the ground water contains high concentrations of dissolved hydrocarbons but little or no liquid-phase hydrocarbons floating on the ground-water table. Under these circumstances, the same physical principles would apply as stated above. However, the air bubbles would extract hydrocarbon vapors from the dissolved-phase hydrocarbons in the ground water instead of from the liquid-phase hydrocarbons floating on the water table. In this embodiment, the air tube would descend into the water table and would otherwise operate the same as above.

While the above detailed description has shown and described the fundamental novel features of the invention as applied to various embodiments, it will be understood that various omissions and substitutions in the form and details of the device illustrated may be made by those skilled in the art, without departing from the spirit of the invention.

What is claimed is:

1. A method of extracting a liquid-phase hydrocarbon from a borehole extending through a water table wherein the liquid-phase hydrocarbon is floating on top of the water in a subsurface ground water table, the method comprising the steps of:

Placing a conduit within said borehole and extending said conduit through said liquid-phase hydrocarbon zone and at least partially into said subsurface ground-water table;

Connecting an upper end of said conduit to a vacuum source means for extracting said liquid-phase hydrocarbon;

Providing a tube into said conduit, said tube extending into said liquid-phase hydrocarbon zone, said tube extends to a point just above said ground-water table;

Allowing an upper end of said tube to remain open to the atmosphere;

Admitting a quantity of air into said liquid-phase hydrocarbon zone from a lower end of said tube; and Operating, said vacuum source to create a negative pressure within said conduit sufficient to cause said contaminant in said liquid-phase hydrocarbon zone to vaporize and be drawn up through said conduit to be received into collecting means at the ground surface.

2. The method of claim 1, wherein said collecting means is a combustion chamber which burns the recovered contaminants.

3. The method of claim 1, wherein said vacuum source means is a vacuum pump operated to create a suction on said conduit sufficient to cause liquid-phase hydrocarbons to vaporize and go up through the conduit to said collecting means.

4. The method of claim 1, further comprising the step of placing said lower end of said tube into the liquid-phase hydrocarbon zone a distance less than the number of inches of water column of suction being applied in said conduit.

* * * * *